(12) United States Patent
Xi et al.

(10) Patent No.: US 8,293,086 B2
(45) Date of Patent: Oct. 23, 2012

(54) CLASSIFICATION SCHEME FOR NANOOBJECTS

(75) Inventors: Ning Xi, Okemos, MI (US); Wai Chiu King Lai, East Lansing, MI (US); Uchechukwu C. Wejinya, Ypsilanti, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 1101 days.

(21) Appl. No.: 12/069,008

(22) Filed: Feb. 6, 2008

(65) Prior Publication Data
US 2008/0217179 A1 Sep. 11, 2008

Related U.S. Application Data

(60) Provisional application No. 60/899,896, filed on Feb. 6, 2007.

(51) Int. Cl.
*G01N 27/447* (2006.01)
*G01N 27/453* (2006.01)
(52) U.S. Cl. .................... 204/547; 204/643
(58) Field of Classification Search .............. 204/547, 204/643
See application file for complete search history.

(56) References Cited

U.S. PATENT DOCUMENTS

| 5,344,535 | A * | 9/1994 | Betts et al. ............... 204/547 |
| 7,161,107 | B2 * | 1/2007 | Krupke et al. ............ 209/127.1 |
| 7,261,352 | B2 * | 8/2007 | Maslov et al. ............. 294/99.1 |
| 7,704,363 | B2 * | 4/2010 | Bryning et al. ............ 204/547 |

FOREIGN PATENT DOCUMENTS
WO    WO 2004/103568 A1 * 12/2004

OTHER PUBLICATIONS

Hennrich et al. "Frequency Dependence of the Dielectrophoretic Separation of Single-Walled Carbon Nanotubes," Journal of Nanoscience and Nanotechnology, vol. 5, 1166-1171, 2005.*
Hughes, "Chapter 14—Nanoparticle Manipulation by Electrostatic Forces" in the Handbook of Nanoscience, Engineering, and Technology, ed. Lyshevski et al., published CRC Press LLC 2003.*
C. A. Furtado, U. J. Kim, H. R. Gutierrez, L. Pan, E. C. Dickey, and P. C. Eklund, "Debundling and dissolution of single-walled carbon nanotubes in amide solvents," *J. Am. Chem. Soc.*, 126:6095-6105, Apr. 24, 2004.
M. J. O'Connell, S. M. Bachilo, C. B. Hu®man, V. C. Moore, M. S. Strano, E. H. Haroz, K. L. Rialon, P. J. Boul, W. H. Noon, C. Kittrell, J. Ma, R. H. Hauge, R. B. Weisman, and R. E. Smalley, "Band gap Fuorescence from individual single-walled carbon nanotubes," *Science*, 297:593-596, Jul. 26, 2002.
N. G. Green, A. Ramos, and H. Morgan, "AC electrokinetics: a survey of sub-micrometre particle dynamics," *J. Phys. D: Appl. Phys*, 33:632-641, Mar. 21, 2000. J. Li, Q. Zhang, N. Peng, and Q. Zhu, "Manipulation of carbon nanotubes using ac dielectrophoresis," *Appl. Phys. Lett.*, 86:153116-153118, Apr. 6, 2005.
M. Dimaki and P. Boggild, "Dielectrophoresis of carbon nanotubes using microelectrodes: a numerical study," *Nanotechnology*, 15:1095-1102, Jun. 25, 2004.
M. S. Arnold, A. A. Green, J. F. Hulvat, S. I. Stupp, and M. C. Hersam, "Sorting carbon nanotubes by electronic structure using density differentiation," *Nature nanotechnology*, 1:60-65, Oct. 4, 2006.
Ralph Krupke, Frank Hennrich, Hilbert v. Lohneysen, and Manfred M. Kappes, "Separation of metallic from semiconducting single-walled carbon nanotubes," *Science*, 301:344-347, Jul. 18, 2003.
Ralph Krupke, Frank Hennrich, Hilbert v. Lohneysen, and Manfred M. Kappes, "Thin films of metallic carbon nanotubes prepared by dielectrophoresis," *Advanced Material*, 18:1468-1470, Apr. 24, 2006.

* cited by examiner

*Primary Examiner* — Alex Noguerola
(74) *Attorney, Agent, or Firm* — Harness, Dickey & Pierce, P.L.C.

(57) ABSTRACT

A method is provided for classifying nanoobjects having different electrical properties, such as conductivities and permittivities. The method includes: suspending nanoobjects having different electrical properties in a liquid medium; passing the liquid medium through a microchamber; and filtering nanoobjects having a first type of electrical property from the liquid medium by applying an electric field to the liquid medium in the microchamber.

22 Claims, 8 Drawing Sheets

CLASSIFICATION SCHEME FOR NANOOBJECTS

CROSS-REFERENCE TO RELATED APPLICATIONS

This application claims the benefit of U.S. Provisional Application No. 60/899,896 filed on Feb. 6, 2007. The disclosure of the above application is incorporated herein by reference.

FIELD

The present disclosure relates to a classification scheme for nanoobjects and, more particularly, to method for filtering and manipulating nanoobjects having different electrical properties.

BACKGROUND

Researchers tried different methods to select and manipulate carbon nanotubes (CNT). For example, C. A. Furtado and U. J. Kim demonstrated increasing the solubility of CNT by attaching functional groups to the CNT. M. J. O'connell and S. M. Bachilo proposed to prepare CNT dilution by sonication and centrifugation. A. Ramos and H. Morgan reviewed different AC electrokinetics forces in microelectrode structures. J. Li and Q. Zhang demonstrated manipulation of bundled CNTs using AC dielectrophoresis. M. Dimaki and P. Boggild calculated dielectrophoretic (DEP) effect on CNT in microelectrode structures. However, the proposed processes mentioned above did not address several major issues.

First, they did not classify specific types of nanoobjects. Different types of nanoobjects have their own application. For examples, semi-conducting CNTs can be used for transistors; whereas, metallic CNTs are candidates for interconnects and wires due to their low resistance and high current-carrying capability.

Second, the structure of a nanoobject and its electrical properties should not be changed or modified during the classification or manipulation process. For instance, the use of strong chemicals for suspension greatly modifies the structure of CNTs such that resulting CNTs lose their excellent electrical properties.

Third, the capability of manipulating and depositing a single/individual nanoobject was not achieved. Most researchers only approximated the situation of DEP manipulation on nanoobjects (i.e. considered the nanoobject as a point particle).

Therefore, it is desirable to provide a classification and manipulation scheme for nanoobjects which addresses these shortcomings. The statements in this section merely provide background information related to the present disclosure and may not constitute prior art.

SUMMARY

A method is provided for classifying nanoobjects having different electrical properties, such as conductivities and permittivities. The method includes: suspending nanoobjects having different electrical properties in a liquid medium; passing the liquid medium through a microchamber; and filtering nanoobjects having a first type of electrical property from the liquid medium by applying an electric field to the liquid medium in the microchamber.

In another aspect of this disclosure, a method is provided for manipulating nanoobjects. The method includes: modeling a nanoobject as a line of adjacent spherical carbon particles; deriving a force model for a nanoobject subject to an electric field based on said modeling; and manipulating a nanoobject using the force model.

In another aspect of the disclosure, a system is provided for constructing a nanodevice. The system is comprised generally of: a pump adapted to receive a liquid having nanoobjects suspended therein; a probe fluidly connected to the pump and operable to deposit a nanoobject from the pump into a work area; a micromanipulator operably coupled to the probe for positioning the probe within the work area; and a microchamber fluidly connected between the pump and the probe which operates to filter nanoobjects having a particular electrical property from a liquid medium passing therethrough.

Further areas of applicability will become apparent from the description provided herein. It should be understood that the description and specific examples are intended for purposes of illustration only and are not intended to limit the scope of the present disclosure.

The drawings described herein are for illustration purposes only and are not intended to limit the scope of the present disclosure in any way.

DETAILED DESCRIPTION

Figure 1:
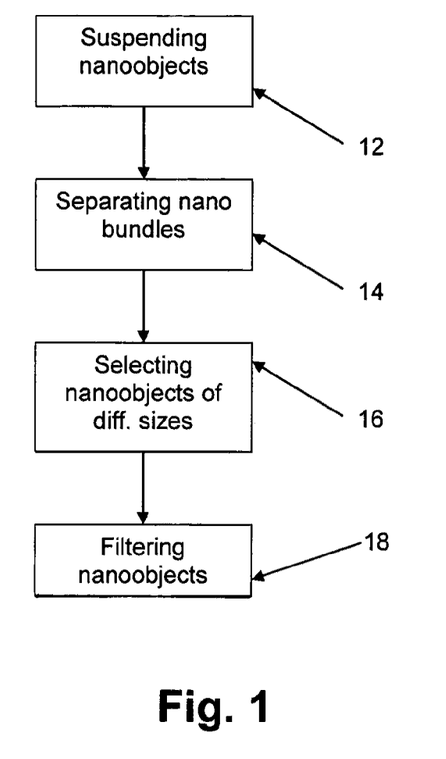
FIG. 1 is a flow diagram illustrating an exemplary classification scheme for nanoobject.

FIG. 1 illustrates an exemplary classification scheme for nanoobjects. Nanoobjects are typically bundled together in powder form after their fabrication. Different sizes and masses of nanoobiects are contained in the powder. Moreover, nanoobjects having different electrical properties (such as conductivities and permittivities) are contained in the powder. While the following description is provided with particular reference to carbon nanotubes (CNTs), it is understood that the classification scheme is applicable to other types of nanoobjects, including but not limited to nanowires, nanorods, nanobeads, bioobjects, bio-molecules, etc.

First, the nanoobject powder is suspended in a liquid solution as indicated at 12. It is important to select the proper solution to dilute and suspend nanoobject. Choosing right surfactants such as sodium dodecyl sulphate (SDS) and dimethylformamide (DMF) can effectively prevent individual nanoobjects from combining together to form a nanoobject bundle after sonication. Choosing other chemical solutions, such as acetone and ethanol, can reduce an extra step of removing the remaining solution after the nanoobject dilution is put on the sample. This is because acetone and ethanol evaporate quickly at room temperature. Other types of suspension solutions are also contemplated by this disclosure.

Figure 2:
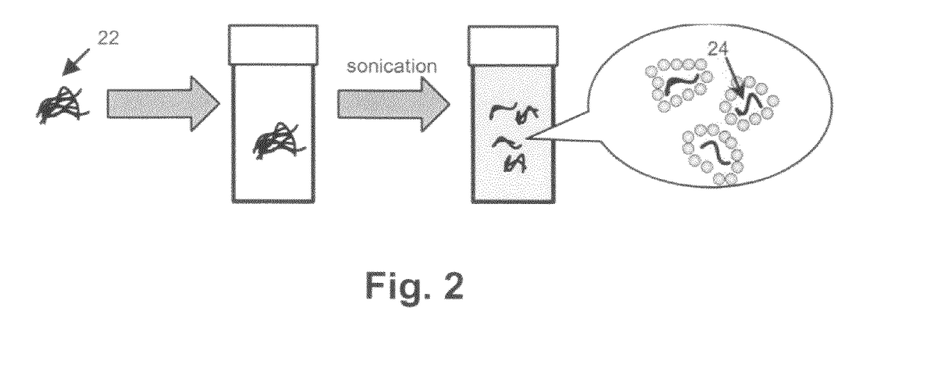
FIG. 2 is a diagram depicting the application of sonication to a nanoobject-based solution.

Sonication is used to break down large bundled nanoobjects found in the solution into smaller bundles and preferably individual nanoobjects. Sonication is the process of applying sound energy (usually ultrasound) to achieve various purposes. In this instance, sonication will break down the nanoobject bundles 22 into smaller bundle or individual nanoobjects (24) as shown in FIG. 2. Different techniques may be used to apply sound energy to the test tube or container which contains the solution.

Figure 3:
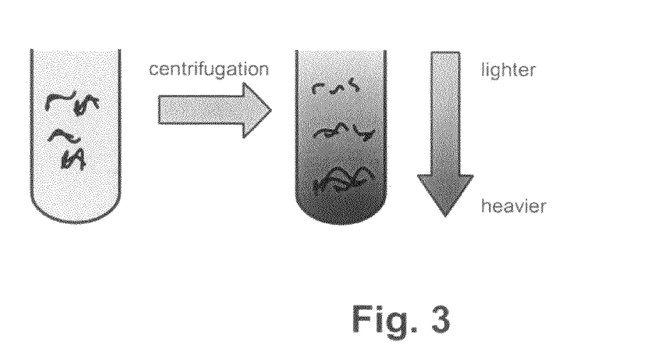
FIG. 3 is a diagram depicting how centrifugation can be used to separate different layers of a nanoobject-based solution.

Centrifugation can then be used to separate nanoobjects based on mass and density difference between the nanoobjects and the solution as shown in FIG. 3. Centrifugation is a process that involves the use of the centripetal force for separation of mixtures. Different protocols exist for centrifugation on different samples. A reliable protocol can be developed to separate different masses and density of nanoojects. The target layer or supernatant should be quickly decanted from the container after the centrifugation.

Figure 4:
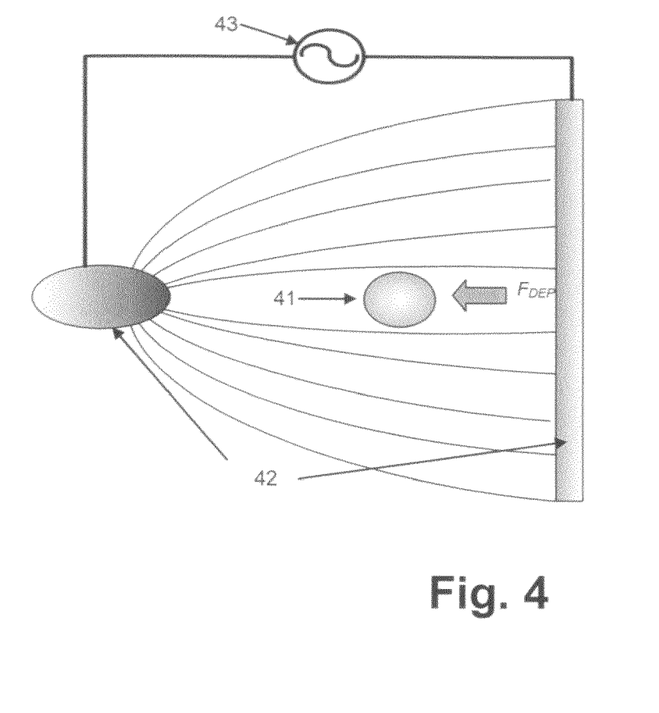
FIG. 4 is a diagram depciting the concept of dielectrophoretic manipulation on a microparticle.

In order to effectively and efficiently classify different types of nanoobjects, electric-field based principle can be used to perform the manipulation. For example, dielectrophoretic (DEP) force is used to manipulate nanoobjects as shown in FIG. 4. Dielectrophoresis is a phenomenon in which a force is exerted on a dielectric particle 41 when it is subjected to a non-uniform electric field. In an exemplary implementation, the non-uniform electric field is generated by immersing an electrode pair 42 into the solution in which a particle is suspended. An AC voltage 43 is then applied to the electrode pair 42, thereby generating an electric field within the solution. The particle can be manipulated by the DEP force acting on the particle. Other techniques for generating an electric field (either uniform or non-uniform) are also contemplated by this disclosure.

The DEP force on a point particle is given as follows:

$$F_{DEP} = \frac{1}{2} V \text{Re}[K(\omega)] \nabla |E|^2 \text{ where} \quad (1)$$

$$K(\omega) = \frac{\varepsilon_p^* - \varepsilon_m^*}{\varepsilon_p^* + 2\varepsilon_m^*},$$

$$\varepsilon^* = \varepsilon - i\frac{\sigma}{\omega}, \quad (2)$$

V is volume of particle, E is electric field, $\in_m^*$ and $\in_p^*$ are complex permittivity of medium and particle, respectively. Complex permittivity depends on a material's properties ($\in$ is real permittivity and σ is conductivity) and the frequency of applied AC voltage. Accordingly, the direction of DEP force is determined by real part of K(ω) which is also called Clausius-Mossotti factor.

Figure 5:
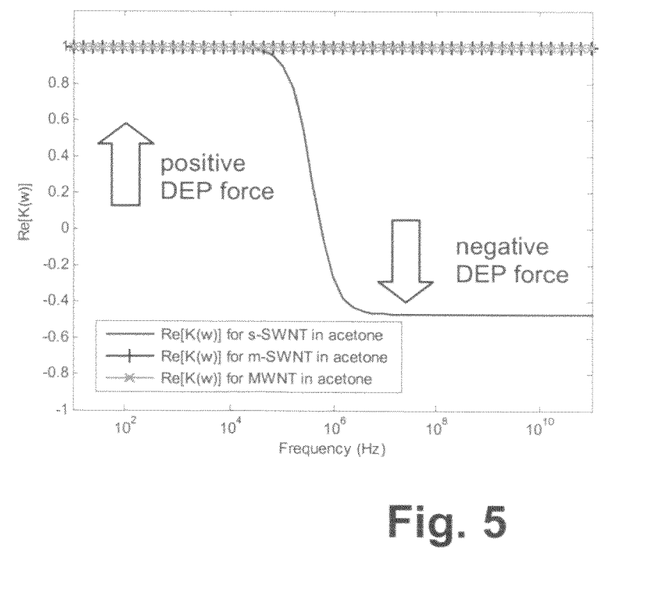
FIG. 5 is a graph illustrating the DEP force on different types of CNTs.

FIG. 5 illustrates the DEP force on different types of CNTs. When Re[K(ω)]>0, it is called positive DEP force and the particle is moved towards micro electrodes (high electric field region). When Re[K(ω)]<0, it is called negative DEP force and the particle is moved away from micro electrodes. In this graph, a semiconducting single-walled CNT is depicted by a solid line; whereas, metallic single-walled and multi-walled CNT are depicted by the other two lines. As shown in the graph, the semiconducting CNTs experience a positive DEP force when the frequency of the applied voltage is less than $10^5$ hertz, but experiences a negative DEP force when the frequency of the applied voltage is greater than $10^6$ hertz. In contrast, the metallic CNTs experience a positive DEP force over this entire range of frequencies. Therefore, nanoobject having different electrical properties can be classified and partitioned through the use of DEP force.

Figure 6:
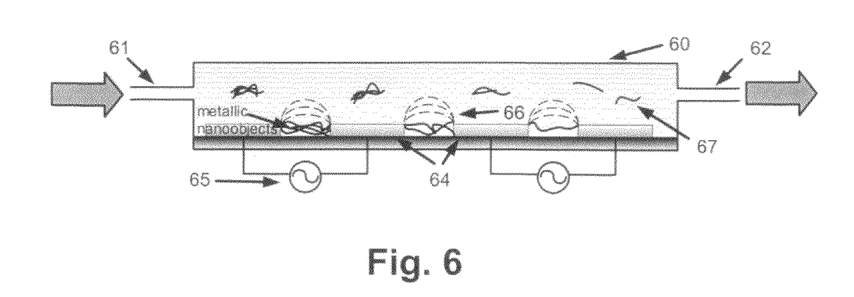
FIG. 6 is a diagram of an exemplary micro chamber for filtering metallic nanoobjects.

An exemplary micro chamber 60 for filtering metallic nanoobjects is depicted in FIG. 6. A solution having metallic and semiconducting nanoobjects is input to an inlet 61 of the micro chamber. An array of symmetric electrodes 64 is formed along an interior bottom surface of the chamber. The electrodes 64 are in turn electrically connected to an AC voltage source 65. When a voltage is applied to the electrodes, an electric field is formed between the adjacent electrodes. Depending on the frequency of the applied voltage, the dielectrophoretic (DEP) force may be used to manipulate the nanoobjects. For instance, at a frequency greater than $10^5$ hertz, metallic nanoobjects 66 passing over the electrodes are attracted to and trapped between the electrodes. Conversely, semiconducting nanoobjects 67 experience a negative force and thus pass over the electrodes. As a result, only semiconducting nanoobjects flow through an outlet 62 of the micro chamber.

Figure 7:
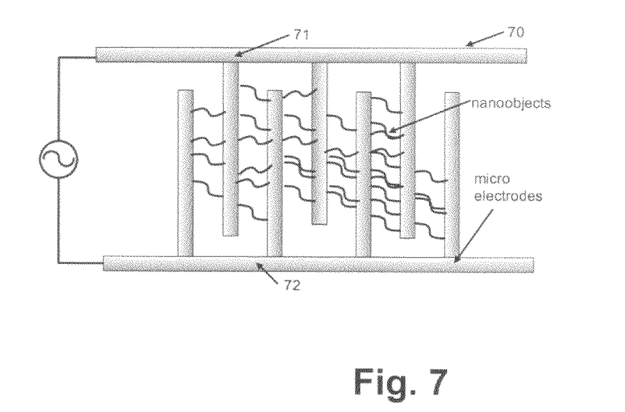
FIG. 7 is a diagram of another exemplary micro chamber for filtering metallic nanoobjects.
Figure 8A:
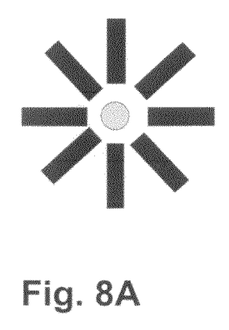
FIGS. 8A-8C are diagrams of different exemplary electrode structures.
Figure 8B:
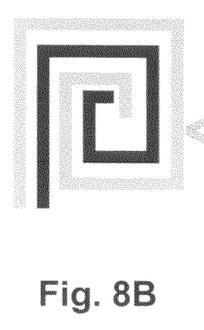
Figure 8C:
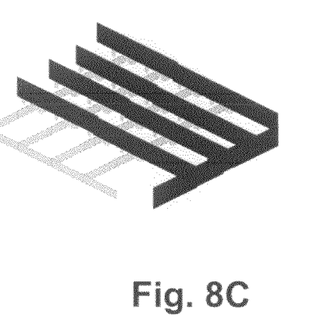

FIG. 7 depicts another electrode arrangement for an exemplary micro chamber 70. In this exemplary embodiment, two sets of electrodes 71, 72 project from opposing sides of the chamber towards the middle of the chamber, thereby forming an interleaved comb-like structure. The electrodes are likewise configured to attract and trap metallic nanoobjects between electrodes. Electrodes having other geometric shapes which create electric fields there between are also contemplated by this disclosure. A few exemplary electrode structures are shown in FIGS. 8A-8C. In addition, asymmetric electrodes or three-dimensional electrodes may also be used to construct the micro chamber.

Figure 9:
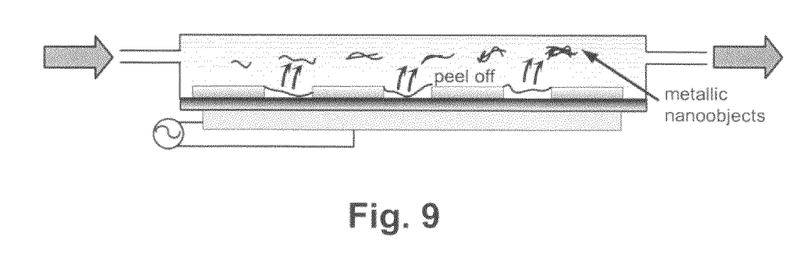
FIG. 9 is a diagram of an exemplary micro chamber for passing metallic nanoobjects.

FIG. 9 depicts a modification to micro chamber which allows manipulation of metallic nanoobject. A piezoelectric material is bonded to an underside of the chamber. When a high frequency signal is applied to the piezoelectric material, it vibrates thereby causing the adjoined chamber to vibrate. Metallic nanoobjects previously trapped between the electrodes can be shaken loose. First, the chamber is filled with pure liquid or solution (that is does not contain any nanoobjects). The AC voltage source connected to the electrode is turned off and, at the same time, the piezoelectric layer is driven to vibrate by another AC voltage. As a result, the previously trapped metallic nanoobjects are peeled off from the electrodes and suspended into the solution. In this way, the chamber can be used to output only metallic nanoobjects.

In order to precisely manipulate a single nanoobject by DEP force, a new modeling for DEP force and electrorotation on nanoobject was developed. On the basis of dielectrophoresis theory, the force exerted by an electric field E on a particle can be written as, $$F = (v\overline{\overline{\alpha}}E \cdot \nabla)E \quad (3)$$

where $\nabla$ is the del operator, v is the volume of the particle, and $\bar{\alpha}$ is the complex effective polarizability. The complex effective polarizability is defined as, $$\tilde{\alpha} = 3\varepsilon_m \underbrace{\left(\frac{\tilde{\varepsilon}_p - \tilde{\varepsilon}_m}{\tilde{\varepsilon}_p + 2\tilde{\varepsilon}_m}\right)}_{\tilde{f}_{CM}} \quad (4)$$

$$= 3\varepsilon_m \tilde{f}_{CM}$$

where $\tilde{f}_{CM}$ is Clausius-Mossotti factor which is described in equation (2).

Figure 10:
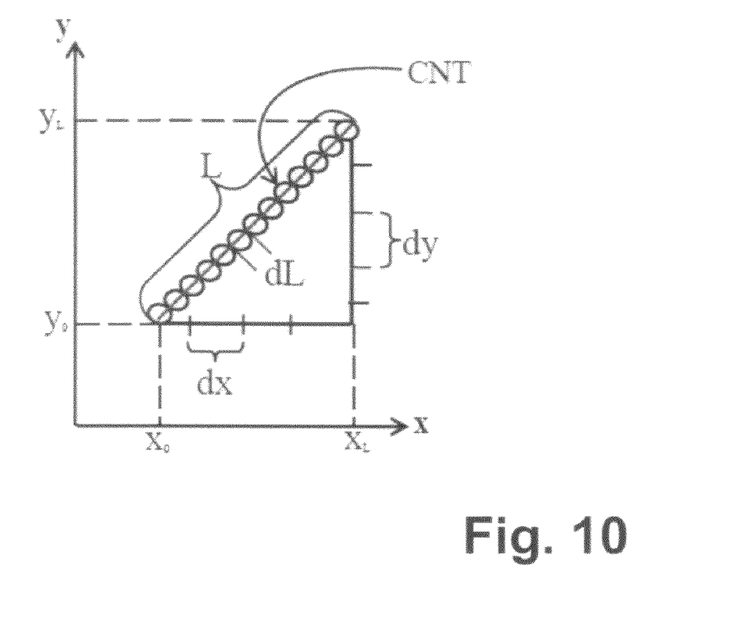
FIG. 10 illustrates the geometry of an exemplary nanoobject.

To model the DEP force distribution for manipulating nanoobjects, it was reasonably assumed that nanoobject form a particle by particle line structure after undergoing AC electric field as shown in FIG. 10. This assumption is particularly suitable for a CNT, but may apply to other types of nanoobjects. The following derivation is based on this assumption. Following the geometry of FIG. 10, the volume of nanoobject particles as, $$\upsilon = \pi r^2 dL \quad (5)$$

where r is the radius of the nanoobject particles and dL is the change in length of nanoobject. By Pythagorean theorem, dL can be written as, $$dL = \sqrt{dx^2 + dy^2} \quad (6)$$

Hence equation (3) is written as, $$dF_{DEP} = (\pi r^2 dL \tilde{\alpha} E \cdot \nabla) E \quad (7)$$

$$= (\pi r^2 dL \tilde{\alpha})(E \cdot \nabla) E$$

By employing vector calculus and the fact that the electric field is irrotational, i.e, a vector field whose curl is zero, ($\nabla \times E = 0$), equation (7) becomes, $$dF_{DEP} = \frac{1}{2}\pi r^2 dL \mathrm{Re}\{\tilde{\alpha}\} \nabla |E|^2 \quad (8)$$

where $\mathrm{Re}\{\bar{\alpha}\}$ is the real part of the complex effective polarizability of both the particle (CNT) and the medium. Assuming that nanoobject is a 2-D object, and the geometry of nanoobject indicated above, we define as follows $$L: y = f(x) \quad (9)$$

By differentiating equation (9), we get the following, $$dy = f'(x) dx \quad (10)$$

Combining equations (6) and (10), dL become $$dL = \sqrt{(f'(x)dx)^2 + dx^2} \quad (11)$$

Simplifying equation (11), we get the following equation.

$$dL = \sqrt{1 + (f'(x))^2} dx \quad (12)$$

Substituting equation (12) into equation (8), we obtain the following DEP equation for $$dF_{DEP} = \frac{1}{2}\pi r^2 \sqrt{1 + (f'(x))^2}\, dx \mathrm{Re}\{\tilde{\alpha}\} \nabla |E|^2 \quad (13)$$

Integrating both sides of equation (13), the dielectrophoretic force on a whole nanoobject particle structure under AC electric field is as follows, $$F_{DEP} = \int_{x_0}^{x_L} \frac{1}{2}\pi r^2 \sqrt{1 + (f'(x))^2}\, dx \mathrm{Re}\{\tilde{\alpha}\} \nabla |E|^2 \quad (14)$$

It can be seen from equation (14), the electric field function now becomes a function of one variable x rather than two variables (x and y). Substituting equation (4) into equation (14) and simplifying, it becomes, $$F_{DEP} = \frac{3}{2}\pi r^2 \varepsilon_m \mathrm{Re}\{\tilde{f}_{CM}\} \int_{x_0}^{x_L} \sqrt{1 + (f'(x))^2}\, \nabla |E|^2 dx \quad (15)$$

It can be seen from equation (15) that the derived dielectrophoretic force, $F_{DEP}$ model for nanoobject depends on the real part of Clausius-Mossotti factor ($\tilde{f}_{CM}$), and therefore on the permittivity and conductivity of both the nanoobject particles and the suspending medium, as well as the frequency of the applied electric field.

The action of an externally applied electric field on a polarized particle results in the formation of an induced dipole moment. When the dipole sits in a uniform electric field, each charge on the dipole experiences an equal and opposite force tending to align the dipole parallel to the electric field, i.e, it experiences a torque. There is usually a time delay that exists between the establishment of the electric field and the formation of the dipole. Consequently, if the field vector changes direction, the induced dipole moment vector much realign itself with the electric field vector, causing particle rotation.

Generally, the torque (electrorotation) experienced by the polarizable particle due to applied electric field can be defined as, $$T = \frac{1}{2}\mathrm{Re}[p \times E] \quad (16)$$

where p and E are the effective dipole moment and electric field respectively. The definition of effective dipole moment given by, $$p = \upsilon \tilde{\alpha} E \quad (17)$$

Equation (16) can be written as, $$T = \frac{1}{2}\upsilon \mathrm{Re}[\tilde{\alpha}(E \times E)] \quad (18)$$

$$= -\upsilon \mathrm{Im}[\tilde{\alpha}](\mathrm{Re}[E] \times \mathrm{Im}[E])$$

Figure 11:
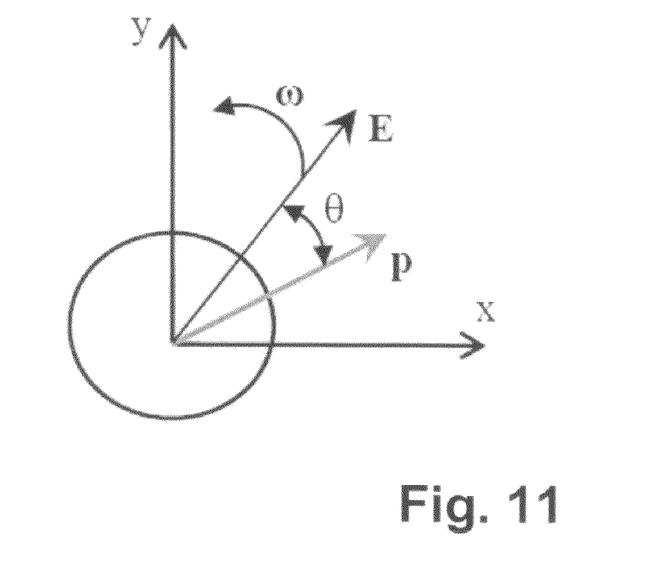
FIG. 11 is a diagram showing how induced dipole moments of a particle lags behind a rotating applied electric field.

With reference to FIG. 11, the torque is zero when the phase angle $\theta$ between the particle's polarization vector p and the applied electric field E is zero. On the other hand, the torque is maximum when the phase angle is $\pm 90°$. If the induced dipole moment lags behind the electric field, then the direction of rotation is with the electric field and vice versa for the induced dipole moment that leads the electric field. Then, the torque equation can be written as, $$T = -\upsilon \mathrm{Im}[\tilde{\alpha}]|E|^2 \quad (19)$$

Following the derivation of dielectrophoretic force, we model the electrorotation (torque) of the nanoobject particles by making the following assumptions:

1) assume nanoobject to be a particle line as illustrated in FIG. 10;
2) torque on the nanoobject is the sum of the segmented (dL) torque as described in FIG. 10. Hence, equation (19) become, $$dT = -3\pi r^2 \varepsilon_m \text{Im}\{\tilde{f}_{CM}\}\sqrt{1+(f'(x))^2}|E|^2 dx \quad (20)$$

Integrating both sides of equation (20), we obtain the electrorotation (torque) on the particled nanoobject under AC electric field as follows, $$T = -3\pi r^2 \varepsilon_m \text{Im}\{\tilde{f}_{CM}\}\int_{x_0}^{xL}\sqrt{1+(f'(x))^2}|E|^2 dx \quad (21)$$

It can be seen from equation (21) that the derived electrorotation (torque) T model for nanoobject in AC electric field depends on the imaginary part of the Clausius-Mossotti factor, and therefore on the permittivity and conductivity of both the nanoobject particles and the suspending medium, as well as the frequency of the applied electric field. It is readily understood that different models could be developed in a similar manner for nanoobjects having different shapes.

Figure 12:
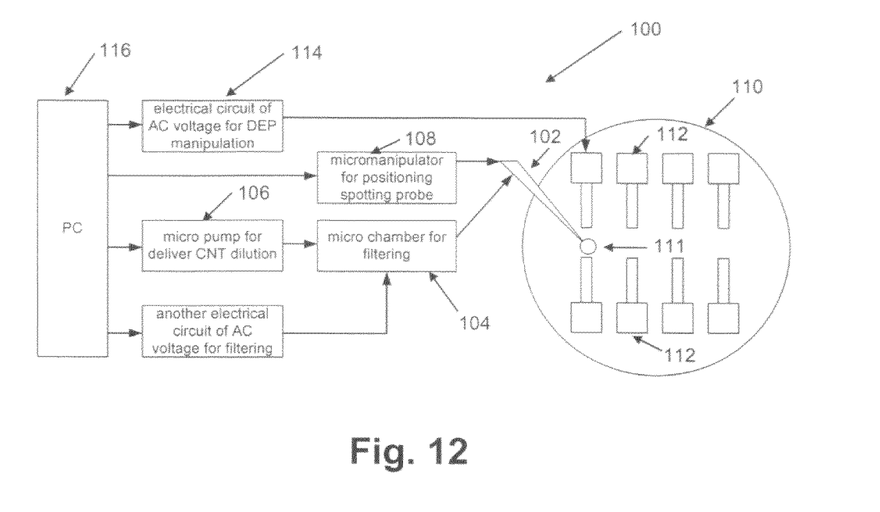
FIG. 12 is an exemplary system for constructing a nanodevice.

FIG. 12 depicts an exemplary system 100 for constructing a nanodevice. The system is generally comprised of a probe 102 fluidly connected via a microchamber 104 to a pump 106 and operably coupled to a micromanipulator 108. Each of these components is further described below.

The pump 106 is configured to receive a liquid having nanoobjects suspended in the liquid. The pump 106 operates to deliver the liquid to the probe 102. The liquid passes through a microchamber 104 fluidly connected between the pump 106 and the probe 102. In particular, the pump 106 is fluidly coupled to an inlet of the microchamber 104 and the probe 102 is fluidly coupled to an outlet of the microchamber 104. The microchamber (104) operates to filter nanoobjects having a particular electrical property from the liquid in the manner described above. An exemplary pump is a DC microdiaphragm pump.

Figure 13:
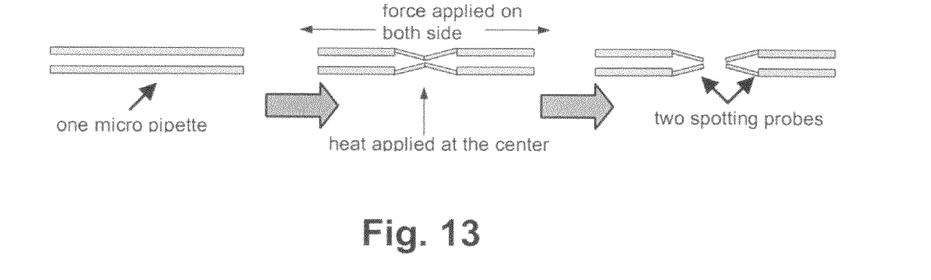
FIG. 13 is a diagram of an exemplary process for making spotting probe.
Figure 14:
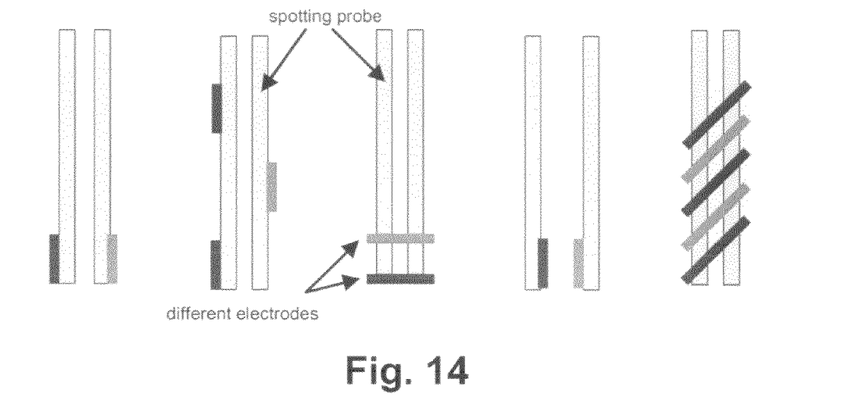
FIG. 14 is a diagram of different exemplary electrodes patterned on a spotting probe.
Figure 15:
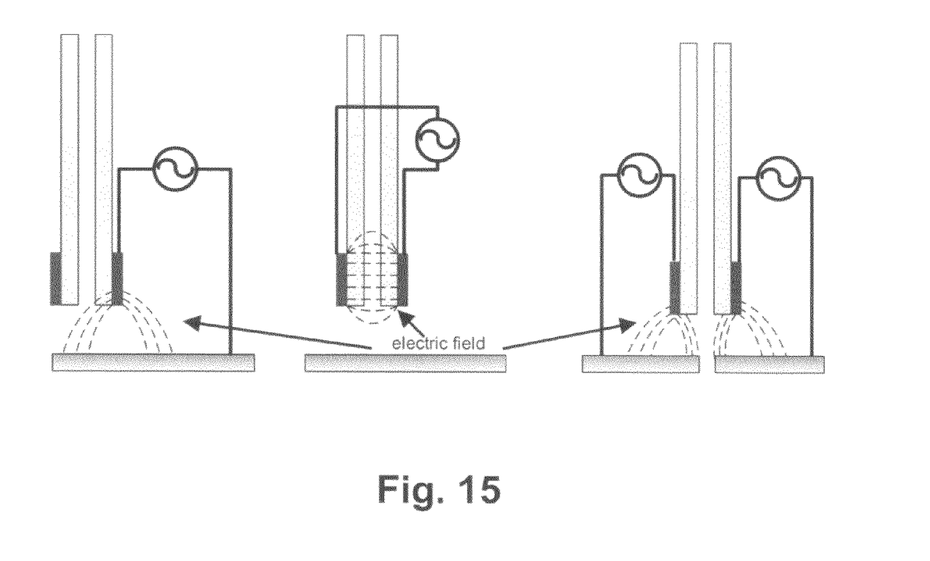
FIG. 15 is a diagram showing different electric fields that can be generated with different electrode patterns.

The probe is fabricated as a spotting probe having a micro-sized probe tip. The probe can be fabricated from micro pipette using mechanical puller as shown in FIG. 13. A raw micro pipette can be put in a mechanical puller which enables pulling the micro pipette on both sides while heating up the middle part of the pipette. By controlling the heating temperature and puller velocity, the center of the pipette is deformed. When the pipette breaks, it forms two spotting probes with micro-sized probe tips. In addition, the probe can be coated with a layer of material which can be patterned in different shapes as shown in FIG. 14. The material serves as microelectrodes which can be used to manipulate the nanoobjects passing through the probe. Different electric fields can be applied among the electrodes formed on the probe tip and/or electrodes formed on a surface of the work area as shown in FIG. 15.

Returning to FIG. 12, the probe 102 is coupled to a micromanipulator 108 which can move the probe 102 to a desired location within a work area 110. In an exemplary embodiment, the work area is a surface of microdevice. In operation, the probe deposits a micron-sized droplet 111 which contains a nanoobject onto the surface of the microdevice. To construct a semiconducting device, the microchamber 104 may be configured to pass only nanoobjects having a semiconducting property. The work surface may have two spaced apart electrodes 112 formed thereon, such that the nanoobject is deposited proximate to the electrodes 112. The nanoobject may then be positioned between the two electrodes 112 using the tip of an atomic force microscope or similar micromanipulator. Further details regarding an exemplary technique for position a nanoobject between two electrodes may be found in International Patent Application No. US2006/028540 filed on Jul. 21, 2006 which is incorporated by reference herein.

In another aspect of the present disclosure, the nanoobject may be aligned with the electrodes through the use of a dielectrophoretic force. In this approach, another voltage source 114 is electrically connected to the electrode pair. A controller 116 in data communication with the voltage source 114 controls the frequency of the AC voltage applied to the electrodes. When the frequency of the applied voltage is less than $10^5$ Hertz, the semi-conducting nanoobject will be attracted to the electrodes in the manner described above. In the case of a carbon nanotube, the nanotube may be more precisely manipulated using the force model described above.

The above description is merely exemplary in nature and is not intended to limit the present disclosure, application, or uses.

What is claimed is:

1. A method for manipulating nanoobjects having different electrical properties, comprising:
    modeling a nanoobject as a cylinder;
    deriving a model that determines force at multiple points along length of the cylinder;
    suspending nanoobjects having different types of electrical properties in a liquid medium;
    generating a dielectrophoretic force within the liquid medium using the derived model; and
    manipulating movement of nanoobjects through the use of the dielectrophoretic force, wherein nanoobjects having a first type of electrical property are manipulated in a manner which is different than nanoobjects having a second type of electrical property which is different than the first type of electrical property.

2. The method of claim 1 further comprises separating bundles of nanoobjects within the liquid medium using sonication and centrifugation.

3. The method of claim 1 wherein generating a dielectrophoretic force further comprises applying a non-uniform electric field to the liquid medium.

4. The method of claim 1 wherein generating a dielectrophoretic force further comprises applying an AC voltage at a specified frequency to an electrode pair immersed within the liquid medium.

5. The method of claim 1 wherein manipulating movement of nanoobjects further comprises attracting nanoobjects having a first type of electrical property to the electrode pair.

6. The method of claim 1 wherein manipulating movement of nanoobjects further comprises attracting nanoobjects having a conducting property to the electrode pair and repelling nanoobjects having a semi-conducting property from the electrode pair.

7. The method of claim 1 further comprises applying an AC voltage at a frequency greater than $10^6$ hertz to electrodes immersed within the liquid medium, thereby attracting nanoobjects having a conducting property to the electrodes.

8. The method of claim 1 wherein the force model is further defined as $$T = -3\pi r^2 \varepsilon_m \text{Im}\{\tilde{f}_{CM}\}\int_{x_0}^{x_L}\sqrt{1+(f'(x))^2}|E|^2 dx$$

where r is a radius of a particle, $\in_m$ is permittivity of a suspending medium, E is an electric field applied to the carbon nanotube and $\tilde{f}_{CM}$ Clausius-Mossotti factor.

9. A method of partitioning nanoobjects having different electrical properties, comprising:
   suspending nanoobjects having different electrical properties in an liquid medium;
   passing the liquid medium through a microchamber;
   applying an AC voltage at a specified frequency to an electrode pair immersed within the liquid medium to generate the non-uniform electric field;
   attracting nanoobjects having a conducting property to the electrode pair and repelling nanoobjects having a semi-conducting property from the electrode pair; and
   vibrating the microchamber while passing another liquid medium which does not contain any nanoobjects through the microchamber, thereby separating the nanoobjects having a conducting property from the electrode pair and suspending the nanoobjects in the another liquid medium.

10. The method of claim 9 further comprises separating bundles of nanoobjects within the liquid medium using sonication prior to filtering the nanoobjects.

11. The method of claim 10 further comprises selecting nanoobjects of different sizes using centrifugation after separating bundles of nanoobjects and prior to filtering the nanoobjects.

12. The method of claim 9 further comprises attracting nanoobjects having the first type of electrical property to the electrode pair and repelling nanoobjects having a second type of electrical property which is different than the first type of electrical property.

13. The method of claim 9 further comprises delivering the nanoobjects having a semi-conducting property through a microprobe to a substrate.

14. The method of claim 13 further comprises generating an electric field proximate to the microprobe to facilitate movement of the nanoobjects through the microprobe.

15. The method of claim 13 further comprises generating an electric field proximate to the microprobe to facilitate movement of the nanoobjects onto the substrate.

16. The method of claim 13 further comprises generating an electric field between electrodes formed on the microprobe and electrodes formed on the substrate.

17. The method of claim 9 further comprises delivering the nanoobjects having a conducting property through a microprobe to a substrate.

18. The method of claim 9 further comprises applying an AC voltage at a frequency greater than $10^6$ hertz to electrodes immersed within the liquid medium, thereby attracting nanoobjects having a conducting property to the electrodes.

19. A method for manipulating a nanoobject, comprising:
   modeling a nanoobject as a cylinder formed by a line of adjacent particles;
   deriving a force model for a nanoobject subject to a non-uniform electric field based on said modeling, where the force model determines distribution of force at different points along a length of the nanobject; and
   manipulating a nanoobject using the force model.

20. The method of claim 19 wherein the force model is further defined as $$T = -3\pi r^2 \varepsilon_m \text{Im}\{\tilde{f}_{CM}\} \int_{x_0}^{x_L} \sqrt{1 + (f'(x))^2}\, |E|^2\, dx$$

where r is a radius of a nanoobject particle, $\in_m$ is permittivity of a suspending medium, E is an electric field applied to the nanoobjects and $\tilde{f}_{CM}$ is Clausius-Mossotti factor.

21. The method of claim 19 wherein manipulating the nanoobjects further comprises controlling force experienced by the nanoobjects by adjusting a frequency of an electric field applied to the nanoobjects.

22. A method for manipulating nanoobjects having different electrical properties, comprising:
   modeling a nanoobject as a cylinder comprised of a plurality of particles in a line;
   deriving a model that determines distribution of force at each particle along the cylinder;
   suspending nanoobjects having different types of electrical properties in a liquid medium;
   generating a dielectrophoretic force within the liquid medium using the derived model; and
   manipulating movement of nanoobjects through the use of the dielectrophoretic force, wherein nanoobjects having a first type of electrical property are manipulated in a manner which is different than nanoobjects having a second type of electrical property which is different than the first type of electrical property.

* * * * *

UNITED STATES PATENT AND TRADEMARK OFFICE
CERTIFICATE OF CORRECTION

| | | |
|---|---|---|
| PATENT NO. | : 8,293,086 B2 | Page 1 of 1 |
| APPLICATION NO. | : 12/069008 | |
| DATED | : October 23, 2012 | |
| INVENTOR(S) | : Ning Xi, Wai Chiu King Lai and Uchechukwu C. Wejinya | |

It is certified that error appears in the above-identified patent and that said Letters Patent is hereby corrected as shown below:

Title Page, Item (56), References Cited, Other Publications, Col. 2, reference No. 4, after "Mar. 21, 2000.", start new paragraph starting with "J. Li, Q. Zhang,".

In the Specifications

Column 1, line 35, "For examples," should be --For example,--.
Column 2, line 30, "depciting" should be --depicting--.
Column 3, line 24, "nanoobjects (24)" should be --nanoobjects 24--.
Column 4, line 43, "there between" should be --therebetween--.
Column 5, line 57, "equation." should be --equation,--.
Column 6, line 34, "much realign" should be --must realign--.
Column 7, line 37, "microchamber (104)" should be --microchamber 104--.
Column 8, line 4, "position" should be --positioning--.
Column 8, line 5, "International Patent Application No." should be --U.S. Patent Publication No.--.

In the Claims

Column 9, line 3, Claim 8, insert --is-- before "Clausius-Mossotti factor".
Column 9, line 7, Claim 9, "an liquid" should be --a liquid--.

Signed and Sealed this
Fourteenth Day of May, 2013

Teresa Stanek Rea
*Acting Director of the United States Patent and Trademark Office*